June 1, 1965  J. P. BACHER  3,186,647
METHOD AND APPARATUS FOR THE DEFIBRATION OF FIBROUS MATERIALS
Filed Oct. 19, 1962

INVENTOR.
Jan Petersen Bacher
BY
Pennie Edmonds Morton Barrows Taylor
ATTORNEYS

3,186,647
METHOD AND APPARATUS FOR THE DEFIBRATION OF FIBROUS MATERIALS
Jan Peterson Bacher, Aalborg, Denmark, assignor to F. L. Smidth & Co., New York, N.Y., a corporation of Delaware
Filed Oct. 19, 1962, Ser. No. 231,716
Claims priority, application Great Britain, Oct. 23, 1961, 37,976/61
11 Claims. (Cl. 241—4)

This invention relates to the defibration of fibrous materials suitable for use as a reinforcement in cement products and is concerned more particularly with a novel method of defibering fibrous materials and with an apparatus, by which the method may be advantageously practiced. The new method and apparatus may be employed in the treatment of various fibrous materials including asbestos and waste paper, but, since all the advantages of the invention are realized in the defibration of asbestos, the use of the method and apparatus for that purpose will be illustrated and described in detail.

Asbestos is now widely used as a reinforcement in cement products, such as pipes and flat or corrugated sheets for use in the building industry, and such products are made by molding a paste or slurry consisting of asbestos, cement, and water, after which the products are stored so that the cement may set and cure. The fiber reinforcement in such sheets and pipes is desirable, since the unreinforced products of the small thicknesses desired would not be of adequate strength. Although asbestos is expensive, it is the fibrous reinforcement best suited for the purpose because it not only adds strength to the products but also makes them highly resistant to fire.

Asbestos is a magnesium silicate mineral having but one direction of fracture so that it is of thread-like structure with the individual asbestos fibers microscopic in thickness and of a length up to two centimeters. Asbestos as quarried includes gangue, which must be removed in operations carried on in disintegrating and screening apparatus of various types. As a result of these operations, the product received from the quarry is in most instances not only substantially free from gangue but has been defibered to some extent, so that the pieces of asbestos are small bundles of fibers resembling pieces of crushed twine and having a length of up to about 25.4 mm. and a diameter of up to about 6.4 mm.

The method of defibration of the present invention is employed in breaking down the fiber bundles of asbestos as delivered from the quarry. Heretofore, such defibration has been carried out by means of edge-runners, which carry on batch operations, and, since these machines have a relatively low output rate, a number of the machines are ordinarily required with a corresponding number of operators. In defibration carried on in an edge-runner, water is added to the asbestos with the amount usually equal to but not exceeding about 35% by weight of the mixture, since a greater amount of water cannot be used because it would flow off the millstone of the apparatus.

The invention is directed to the provision of a method of defibering asbestos as received from the quarry, which is more economical than prior methods and produces a better product for use as a reinforcement in cement manufacture. The new method is based on the discovery that the defiberation of the pieces of asbestos from the quarry can be carried on to great advantage by grinding the asbestos material in a rod mill modified in a number of respects. The possibility of using a rod mill for the purpose is surprising, since it might be expected that the brittle asbestos fibers would be beaten into minute particles by the rough treatment, to which they are subjected by the heavy rods in the mill and by the action of the pieces upon one another. It has been found in practice, however, that the following advantageous results are obtained in defibering asbestos by the use of the rod mill as compared with defibration by means of the edge-runners heretofore used.

An installation for defibering asbestos, which includes eight edge-runners, has a power consumption of about 55 kwh. per ton of dry asbestos, whereas, when defibration is carried out to the same extent in a rod mill, the power consumption is about 18 kwh. A single rod mill having a diameter of about 6 feet 6 inches and a length of about 11 feet 6 inches has an output about the same as the eight edge-runners and the fibrous material produced in the rod mill is better than that obtained by means of edge-runners in that sheets and pipes made with asbestos defibered in a rod mill require about 10% less fiber and are of better quality than those made with asbestos fibers produced by means of edge-runners. Such a saving in the amount of asbestos required in the manufacture of asbestos cement products and the improvement in their quality are of substantial importance. Another advantage of the rod mill is that such a mill operates continuously as against the batch operation of edge-runners and requires about twenty less men per day than the edge-runner installation having an equivalent output. Another desirable feature of a rod mill is that it is an enclosed unit and thus creates no dust nuisance.

In the practice of the method of the invention, the pieces of asbestos received from the quarry are mixed with water in an amount which may vary between 10% and 50% by weight of the mixture depending on the nature of the asbestos and preferably runs from 15% to 25%. The water is metered and the water content of the mixture is maintained accurately within the specified limits. Such control of the water in the mixture is desirable since it facilitates the preparation of the final paste or slurry by the further addition of water to the mixture. In the preparation of the mixture of asbestos and water to be introduced into the rod mill, it is common to mix asbestos from different sources in measured amounts and, for this purpose, the different kinds of asbestos are mixed in a container containing rotary arms or similar stirring devices and, during the mixing operation, water is fed into the container in the desired amount. The asbestos-water mixture is then delivered to the feed tank of the rod mill and the tank provided is of such capacity that the mixture may be fed continuously into the mill, even though the tank itself receives the mixture in batches.

It has been found that, in the mill, it is desirable to use rods in such number that the rods occupy between 25% and 45% of the internal volume of the mill shell. The material is then fed to the mill under control and at such a rate that the material near the mill outlet occupies the cavities between the rods but does not extend appreciably above the rods. By operating the mill as described with the asbestos lying only in the cavities between the rods adjacent to the mill outlet, the asbestos leaves the mill sufficiently rapidly as not to block the outlet.

The rod mill is preferably operated at a speed between 50% and 80% of the critical speed of the mill, such speed being defined by the expression $$n_c = \frac{423}{\sqrt{D}}$$

in which $n_c$ is the number of revolutions per minute of the mill and D is the diameter of the mill measured in centimeters. The critical speed of the mill is the speed at which some or all of the rods lying nearest the mill periphery are held against the mill wall by centrifugal force during the mill rotation. When the speed is lower than the critical speed, the rods are carried up with the rising mill wall but, before reaching the top of the mill, they roll or slide by gravity down over the remaining rods and the asbestos and thereby effect defibration.

The rod mill comprehended by the invention differs from standard rod mills in a number of respects and the changes adapt the mill to the practice of the new method. The changes have to do with the omission of screens, the location and form of the outlet openings, and, in the preferred form, the use of rods of a special construction.

For a better understanding of the invention, reference may be made to the accompanying drawing, in which FIG. 1 is a view in longitudinal section through a rod mill suitable for the practice of the method of the invention;

Figure 1:
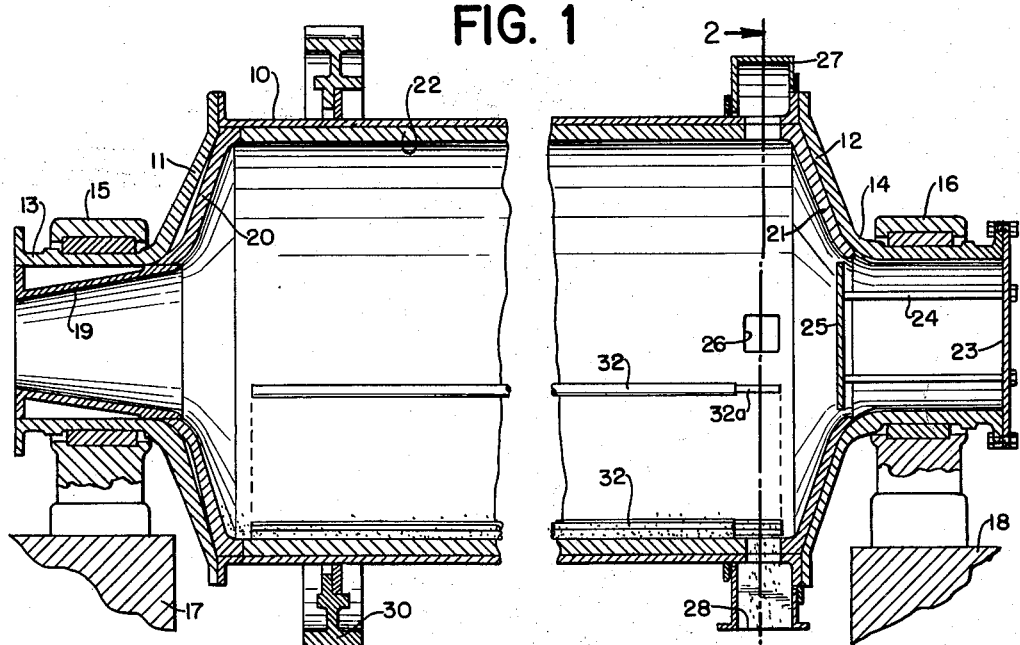

The mill illustrated comprises a cylindrical shell 10 closed at its ends by frusto-conical heads 11, 12, which are prolonged as hollow axial trunnions 13, 14. The mill is supported for rotation in bearings 15, 16, in which the trunnions run and which are mounted on foundations 17, 18.

The interior of the mill is provided with the usual lining formed of wear-resistant plates 19, 20, 21 and 22 lying within the trunnion 13 and the mill heads and shell. The trunnion 33 serves as the mill inlet and the outer end of the trunnion 14 is closed by a cover plate 23 bolted in place and provided with stay bolts 24 carrying a lining plate 25 substantially closing the inner end of the passage through the trunnion. The lining plate 25 is of such size and shape that it may be drawn through the trunnion when the cover plate 23 is removed.

Figure 2:
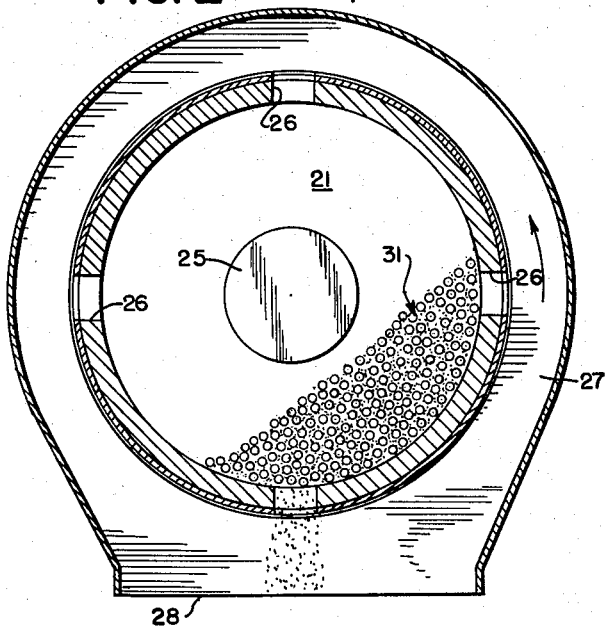
FIG. 2 is a cross-sectional view on the line 2—2 of FIG. 1.

The mill is provided near the head 12 with a plurality of outlet openings 26, which extend through the lining 22 and the mill shell and, in the mill illustrated, are four in number. These openings are large compared with the openings normally provided at such a location in standard rod mills and have an area of at least 100 cm.$^2$. The openings shown are approximately rectangular in shape with their dimensions axially and circumferentially of the mill about equal. The openings are equally spaced about the circumference of the mill shell and are wholly unobstructed, whereas, in a standard rod mill having a single interior compartment and a peripheral discharge, the outlet openings either have the form of narrow slots preventing the passage of material not sufficiently reduced in size or else are larger and are covered by grates or grids, which similarly prevent the escape of oversize material. The zone of the mill shell, in which the openings 26 are formed, is enclosed in a stationary casing 27 having an opening 28 at its bottom through which the material is discharged into a chute not shown. The mill is also encircled by a gear wheel 30 meshing with a pinion, not shown, which drives the mill in the direction of the arrow in FIG. 2.

Figures 3, 4:
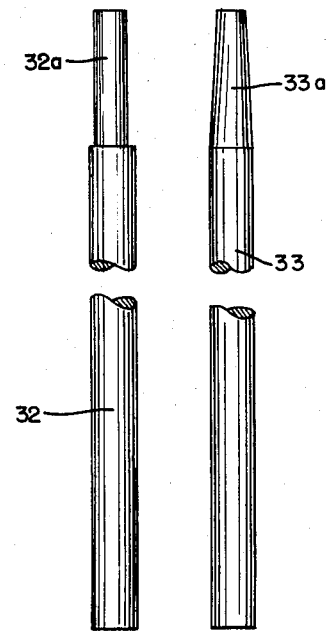
FIGS. 3 and 4 are elevational views of two forms of rods suitable for use in the mill.

The mill contains a charge of rods 31, which perform the defibration operation, and these rods are shorter than the length of the cylindrical mill shell by 40 to 50 mm. and have a diameter between 50 and 80 mm. At their ends adjacent the outlet end of the mill, the rods are of a diameter between 50% and 80% of the diameter elsewhere and the length of the sections of the rod of smaller diameter is between 100 and 300 mm. In the rod 32, shown in FIG. 3, the section 32a of reduced diameter is cylindrical whereas, in the rod 33, shown in FIG. 4, the sections 33a of reduced diameter is frusto-conical. By the use of the rods described, additional space for asbestos is provided between the rods adjacent to the outlet openings and discharge of the defibrated material is facilitated.

In the practice of the method of the invention by the use of the rod mill described, the pieces of asbestos from the quarry may be mixed with an amount of water as required by the nature of the asbestos and up to 50% by weight of the mixture. In the mill, the defibration is carried on rapidly and with much less power consumption than is required for the operation of an edge-runner installation of like capacity. Also less labor is required and the product is superior to that produced by edge-runners, in that less of the fiber is needed in cement products in which the fiber is employed as a reinforcement and the products are of better quality. The savings in power and labor in the defibrating operation and in the amount of the fiber required in asbestos cement product manufacture lower the cost of the final products substantially.

I claim:

1. A method of defibrating asbestos in the form of small fiber bundles, which comprises making a mixture of the asbestos material as received from the quarry substantially free from gangue with water with the water present in an amount not less than about 10% nor more than about 50% by weight of the mixture and subjecting the mixture to the action of the rods in a rod mill.

2. The method of claim 1, in which the fiber bundles are of a length up to about 25.4 mm. and of a diameter up to about 6.4 mm.

3. The method of claim 1, in which the water present is not less than about 15% nor more than about 25% of the weight of the mixture.

4. The method of claim 1, in which the rods occupy not less than about 25% nor more than about 45% of the volume of the interior of the mill.

5. The method of claim 1, which includes controlling the introduction of the mixture into the mill in such manner as to insure that the asbestos material occupies the cavities between the rods near the outlet of the mill and does not extend appreciably above the rods.

6. The method of claim 1, in which the mill is rotated at a speed not less than about 50% nor more than about 80% of the critical speed of the mill.

7. A rod mill for use in defibering asbestos in the form of small fiber bundles, which comprises a generally cylindrical shell having an unobstructed interior with end plates and hollow trunnions connected to the end plates and extending axially therefrom, one trunnion having an open outer end and serving as an inlet, the shell having a plurality of unobstructed outlet openings adjacent to the end plate remote from the inlet and uniformly distributed circumferentially, bearings for the trunnions, a charge of rods in the mill in contact with the shell, the rods having relatively short sections of reduced diameter at their ends adjacent to the outlet openings, and a casing enclosing the zone of the shell containing the outlet openings.

8. The mill of claim 7, in which each outlet opening has an area of at least 100 cm.$^2$.

9. The mill of claim 7, in which the outlet openings are substantially square.

10. The mill of claim 7, in which the rods have sections of reduced diameter at their ends adjacent to the outlet openings and the section of reduced diameter of at least some of the rods is cylindrical and of a diameter not less than about one-half nor more than about four-fifths of the diameter of the main part of the rod.

11. The mill of claim 7, in which the rods have sections of reduced diameter at their ends adjacent to the outlet openings and the section of reduced diameter of at least some of the rods is frusto-conical and its smallest diameter is not less than about one-half nor more than about four-fifths of the diameter of the main part of the rod.

References Cited by the Examiner
UNITED STATES PATENTS

| | | | |
|---|---|---|---|
| 1,366,651 | 1/21 | Hardinge | 241—184 X |
| 2,899,139 | 8/59 | Hardinge | 241—422 |

FOREIGN PATENTS 562,161   6/44   Great Britain.

OTHER REFERENCES

Engineering and Mining Journal-Press, volume 119, issue 15, pages 607–608, published date April 11, 1925.

Denver Equipment Company, (Bulletin B2–B13), January 26, 1954, publication (page 23).

J. SPENCER OVERHOLSER, *Primary Examiner.*

ROBERT A. O'LEARY, *Examiner.*

UNITED STATES PATENT OFFICE
CERTIFICATE OF CORRECTION

Patent No. 3,186,647                         June 1, 1965

Jan Peterson Bacher

It is hereby certified that error appears in the above numbered patent requiring correction and that the said Letters Patent should read as corrected below.

Column 2, line 3, strike out "pose is surprising, since it might be expected that the" and insert the same before "brittle" in line 1, same column 2; column 3, line 36, for "33" read -- 13 --.

Signed and sealed this 19th day of October 1965.

(SEAL)
Attest:

ERNEST W. SWIDER
Attesting Officer

EDWARD J. BRENNER
Commissioner of Patents